United States Patent [19]

Woo

[11] 4,085,074

[45] Apr. 18, 1978

[54] PRE-MIXED CATALYZED VINYL ACETATE POLYMER ADHESIVE COMPOSITION

[75] Inventor: Ming Cho Woo, Willingboro, N.J.

[73] Assignee: National Casein of New Jersey, Riverton, N.J.

[21] Appl. No.: 671,269

[22] Filed: Mar. 29, 1976

[51] Int. Cl.$^2$ .............................................. C08L 1/28
[52] U.S. Cl. .......................... 260/17 R; 260/29.6 WA; 428/514
[58] Field of Search ...................... 26/17 R, 29.6 WA; 428/514

[56] References Cited

U.S. PATENT DOCUMENTS

| | | | |
|---|---|---|---|
| 3,213,051 | 10/1965 | Pink | 260/29.6 WA |
| 3,563,851 | 2/1971 | Amour et al. | 260/29.6 WA |
| 3,644,257 | 2/1972 | Nickerson et al. | 260/29.6 WA |

Primary Examiner—Edward M. Woodberry
Attorney, Agent, or Firm—Max R. Millman

[57] ABSTRACT

A pre-mixed adhesive composition comprised of a vinyl acetate polymer emulsion including a cross-linking catalyst and a cross-linking inhibitor providing a good cured water resistant Type II bond and extended shelf life so that the adhesive composition will not gel over an extended period of time and will therefore be usable for direct gluing application to semi-porous and porous substrates.

19 Claims, No Drawings

PRE-MIXED CATALYZED VINYL ACETATE POLYMER ADHESIVE COMPOSITION

This invention relates to cross-linkable vinyl acetate polymer emulsions containing a curing or cross-linking agent for use as an adhesive for porous and semi-porous materials.

Heretofore, gluing operations using cross-linkable vinyl acetate polymer emulsions required the mixing of the emulsion with a catalyst, i.e. a curing or cross-linking agent prior to application to the substrates to be glued in presssing equipment. See, for example, the Armour et al patent No. 3,563,851. Because the cross-linking of the resin occurs over a relatively short period of time after addition of the catalyst, the mix gels over that relatively short period of time and therefore cannot then be employed as a workable adhesive.

The primary object of this invention is to provide an adhesive emulsion comprising a polymerized cross-linkable vinyl acetate resin, a cross-linking catalyst and a cross-linking inhibitor, which adhesive provides a cured water resistant Type II bond and possesses increased shelf life and can therefore be used over a relatively long period of time for direct application ot porous and semi-porous substrates for gluing in appropriate pressing equipment.

Another object of the invention is to provide an adhesive composition comprising a cross-linkable vinyl acetate polymer resin emulsion, an acidic inorganic metal salt cross-linking catalyst and a basic organic cross-linking inhibitor, which adhesive composition provides a Type II water resistant bond and possesses a shelf life considerably extended over the shelf life of a mixture of the resin emulsion and catalyst alone.

Another object of the invention is to provide an adhesive composition of the character described which possesses a shelf life increased over that of the composition without the inhibitor and a shear strength of at least 50 psi using a one-half hour boil test following the procedure set forth in ASTM D-1151-72.

The foregoing objects are obtained by providing an aqueous resin emulsion containing vinyl acetate polymerized with alkyl esters of acrylic acid or methacrylic acid, such as methyl acrylate, ethyl acrylate, butyl acrylate, methyl methacrylate and ethyl methacrylate and N-alkylol derivatives of amides of alpha, beta-unsaturated carboxylic acids, such as N-methylol acrylamide, a protective hydrocolloid emulsifier such as polyvinyl alcohol or cellulosic dispersing agents, e.g. hydroxyethylcellulose, carboxymethylcellulose, etc., a cross-linking catalyst in the form of an acidic metal salt such as aluminum chloride, aluminum nitrate, chromic chloride and chromic nitrate, and a cross-linking inhibitor in the form of an amine such as ammonia, the alkyl and alkanol amines, e.g. mono, di and triethylamine and mono, di and triethanolamine.

The resin emulsion is made by polymerization techniques known in the art using free radical or redox catalysts. A monomer mixture of 80–97% by weight of vinyl acetate, remainder in varying amounts of an alkyl ester of acrylic acid and an N-alkylol derivative of an amide of an alpha, beta-unsaturated carboxylic acid is refluxed at about 60°–90° C with agitation in an aqueous medium containing in addition to the monomer mixture 3–6% of a hydrocolloid by weight of the monomer mixture, the free radical or redox polymerization catalysts, a defoamer and an emulsifier. The reaction is carried on for about 3 to 6 hours and the resultant aqueous resin emulsion has a solids content of about 40–60%.

At present, this resin emulsion is used as a two-part adhesive for admixture with an acidic metal cross-linking catalyst solution such as $AlCl_3$, $Al(NO_3)_3$, $CrCl_3$ and $Cr(NO_3)_3$ at the site where application of the adhesive in appropriate pressing equipment is to be carried out. The resin emulsion per se can be stored at room temperature for at least 3 months, but once the same is admixed with the cross-linking catalyst the mix has a considerably reduced shelf or pot life. Over a range of 1.0 to 12.0 parts by weight of the catalyst solution per 100 parts by weight of the resin emulsion, where the acidic salt concentration of the catalyst solution is about 0.21 gram equivalents per 100 gms catalyst solution, the shelf life varies from about 14 days to about 45 days. This mix yields a Type II water resistant bond as defined in Federal Specification MMM-A-188b, Nov. 8, 1960 entitled "Adhesive; Urea-Resin-Type (Liquid and Powder)", which is herein incorporated by reference.

In accordance with the instant invention, the resin emulsion includes about 0.0032 to 0.025 gram equivalents per 100 grams of emulsion of an acidic metal salt catalyst and a cross-linking inhibitor in sufficient amount and concentration to at least increase, and preferably double, the shelf life of the resin emulsion plus catalyst alone and provide a bond whose shear strength is at least 50 psi when subjected to a preconditioning for one day and one-half hour boil test as set forth in par. 4.1 and condition 16 respectively of ASTM D-1151-72, which is herein incorporated by reference.

The acidic metal salt cross-linking agent is preferably added to the resin emulsion in the form of a solution containing about 0.21 gram equivalents of the catalyst per 100 grams of the catalyst solution. Said catalyst solution is added to the resin emulsion in an amount of about 1.5 to 12.0 parts by weight of the catalyst solution to 100 parts by weight of the resin emulsion. Thus, there is present in the resin emulsion about 0.0032 to 0.025 gram equivalents of the catalyst per 100 grams of resin emulsion. The cross-linking inhibitor is present in the resin emulsion in an effective amount up to a maximum mole ratio of inhibitor to catalyst of about 0.7 to 1.7.

The preferred adhesive composition includes a resin emulsion (hereinafter RE in the Tables), comprising a monomer mixture of about 90–92% vinyl acetate, about 4–6% ethyl acrylate and about 2–5% N-methylol acrylamide, by weight polymerized with the use of a redox or free radical type catalyst system in an aqueous medium containing about 5% polyvinyl alcohol, in the manner described hereinbefore, the solids content of the resultant emulsion being about 50% by weight. The resin emulsion (RE) is white, has a pH of 4.5 to 5.5, a viscosity of 3000–5000 cps (25° C) and a specific gravity of about 1.09. To this resin emulsion is added an aqueous solution of aluminum chloride in an amount of about 1.5 to 12.0 parts by weight of the aluminum chloride solution to 100 parts by weight of the resin emulsion, said aluminum chloride solution containing about 0.21 gram equivalents $AlCl_3$/100 gms solution, thus providing 0.0032 to 0.025 gram equivalents of $AlCl_3$ per 100 grams of resin emulsion, and triethanolamine (TEOA) in a mole ratio of TEOA/$AlCl_3$ up to about 0.7 to 1.7 as a maximum. To obtain an adhesive composition which will possess a shelf life which is increased over that of the resin emulsion plus catalyst alone and also possess a cured water resistance bond of at least 50 psi in a one-half hour boil test, the minimum TEOA/AlCl₃ mole ratio is about 0.1 to 0.2.

instant invention, control compositions and comparative results as to shelf life and shear strength.

Table I

| Example No. | (Controls) | | | | | |
|---|---|---|---|---|---|---|
| | 1 | 2 | 3 | 4 | 5 | 6 |
| RE (Resin Emulsion), g | 100 | 100 | 100 | 100 | 100 | 100 |
| AlCl₃*, Aqueous solution, g | 1.0 | 2.0 | 5 | 8 | 10 | 12 |
| Initial pH | 3.35 | 3.10 | 2.85 | 2.75 | 2.45 | 2.40 |
| Initial Viscosity, cps (25° C) | 3250 | 1835 | 1075 | 850 | 1365 | 825 |
| Shelf or Pot Life, days | 25 | 27 | 27 | 44 | 15 | 14 |
| O/N Cured | | | | | | |
| Dry, psi - % W.F. | 878–80 | — | 765–100 | 572–100 | 492–100 | — |
| ½ hr. Boil, psi - % W.F. | 194–0 | — | 256–0 | 266–1 | 319–85 | — |
| 48 hr. Soak, psi - % W.F. | 330–7 | — | 472–36 | 461–100 | 374–100 | — |
| 2 Week Cured | | | | | | |
| Dry, psi - % W.F. | 821–56 | — | — | 493–100 | 450–100 | — |
| 2 Cycle Boil, psi - % W.F. | Del. | — | — | 266–4 | 277–90 | — |
| 48 Hr. Soak, psi - % W.F. | 358–0 | — | — | 477–100 | 346–100 | — |

Key: O/N = Overnight; Del. = delaminated
W.F. = Wood failure
*=° Baume, approx. 28 wt. % AlCl₃ (about 0.21 gm equivs. AlCl₃/100 gms soln.)

Table II

| Example No. | (Compositions of Instant Invention) | | | | | | | |
|---|---|---|---|---|---|---|---|---|
| | 7 | 8 | 9 | 10 | 11 | 12 | 13 | 14 |
| RE (Resin Emulsion), g | 100 | 100 | 100 | 100 | 100 | 100 | 100 | 100 |
| Triethanolamine (TEOA) 85 wt. %, g | 0.5 | 1.5 | 1.85 | 2 | 5.5 | 3.67 | 5 | 7.4 |
| AlCl₃*, aqueous solution, g | 2 | 4 | 5 | 8 | 10 | 10 | 12 | 12 |
| Mole Ratio (TEOA/AlCl₃) | 0.68 | 1.0 | 1.0 | 0.68 | 1.5 | 1.0 | 1.1 | 1.67 |
| Initial pH | 3.7 | 3.7 | 3.65 | 3.45 | 3.8 | 3.4 | 3.5 | 3.70 |
| Initial Viscosity, cps (25° C) | 1175 | 1050 | 1050 | 550 | 900 | 800 | 600 | 550 |
| Shelf or Pot Life, days | 186 | 180 | 111 | 207 | 171+ | 178+ | 190+ | 30+ |
| O/N Cured | | | | | | | | |
| Dry, psi - % W.F. | 658–100 | 660–100 | 668–100 | 581–100 | 620–100 | 539–100 | 582–100 | 520–100 |
| ½ hr. Boil, psi - % W.F. | 466–33 | 316–0 | 299–0 | 307–0 | 254–0 | 234–0 | 276–0 | 48–0 |
| 48 hr. Soak, psi - % W.F. | 534–35 | 452–25 | 385–2 | 486–14 | 326–0 | 339–22 | 400–14 | 348–0 |
| 2 Week Cured | | | | | | | | |
| Dry, psi - % W.F. | 645–100 | 604–100 | 681–100 | 535–100 | 636–100 | 548–100 | 574–100 | 528–100 |
| 2 Cycle Boil, psi - % W.F. | 384–1 | 311–0 | 288–0 | 214–0 | 194–0 | 198–0 | 256–0 | Del. |
| 48 Hr. Soak, psi - % W.F. | 530–75 | 440–1 | 407–2 | 480–25 | 336–0 | 378–15 | 431–32 | 310–0 |

*Same solution as in Table I; Del. = delaminated

Table III

| Example No. | (Compositions of Instant Invention + Controls) | | | | | | | | |
|---|---|---|---|---|---|---|---|---|---|
| | 15 | 16 | 17 | 18 | 19 | 20 | 21 | 22 | 23 |
| RE (Resin Emulsion), g | 100 | 100 | 100 | 100 | 100 | 100 | 100 | 100 | 100 |
| AlCl₃*, aqueous solution, g | 4 | 4 | 4 | — | — | — | — | — | — |
| Triethanolamine 85wt.%, g | — | — | — | — | 1.48 | — | 0.86 | — | 1.94 |
| Triethylamine 100wt.%, g | 1 | — | — | — | — | — | — | — | — |
| N-Methyl Ethanolamine 100wt.%, g | — | 0.42 | — | — | — | — | — | — | — |
| NH₄OH 30wt.% as NH₃, g | — | — | 0.58 | — | — | — | — | — | — |
| Cr(NO₃)₃* aqueous solution, g | — | — | — | 4 | 4 | — | — | — | — |
| Al(NO₃)₃* aqueous solution, g | — | — | — | — | — | 2.3 | 2.3 | — | — |
| CrCl₃* aqueous solution, g | — | — | — | — | — | — | — | 4.4 | 5.3 |
| Mole Ratio (amine/catalyst) | 1.18 | 0.67 | 1.22 | — | 1.0 | — | 1.0 | — | 1.0 |
| Initial pH | 3.70 | 3.50 | 3.65 | 2.80 | 4.10 | 3.10 | 3.80 | 3.40 | 4.70 |
| Initial Viscosity, cps (25° C) | 1350 | 975 | 1000 | 1600 | 1625 | 1400 | 1450 | 1275 | 900 |
| Shelf or Pot Life, days | 221 | 131 | 265 | 21 | 56 | 45 | 63+ | 24 | 61+ |
| O/N Cured | | | | | | | | | |
| Dry, psi - % W.F. | 604–100 | 560–100 | 709–100 | 717–60 | 738–75 | 727–100 | 778–80 | 651–90 | 690–100 |
| ½ hr. Boil, psi - % W.F. | 312–03 | 323–10 | 274–0 | 522–30 | 171–0 | 443–2 | 112–0 | 558–52 | 60–0 |
| 48 hr. Soak, psi - % W.F. | 482–49 | 509–* | 486–23 | 596–32 | 415–2 | 506–50 | 416–0 | 564–75 | 442–0 |
| 2 Week Cured | | | | | | | | | |
| Dry, psi - % W.F. | 534–100 | 587–100 | 648–88 | 890–100 | 731–100 | 812–100 | 876–82 | 732–100 | 794–90 |
| 2 Cycle Boil, psi - % W.F. | 281–2 | 251–0 | 290–0 | 216–0 | Del. | 162–0 | 48–0 | 276–0 | 48–0 |
| 48 Hr. Soak, psi - % W.F. | 469–100 | 498–59 | 526–25 | 628–62 | 374–0 | 558–49 | 425–0 | 586–50 | 459–2 |

*about 0.21 gm equivs. catalyst/100 gm solution
Del. = delaminated

The adhesive composition may also include, instead of the terpolymerized resin emulsion described hereinbefore, a resin emulsion containing about 90–98% by weight vinyl acetate copolymerized with about 2–10% by weight of an N-alkylol derivative of an amide of an alpha, beta-unsaturated carboxylic acid, preferably N-methylol acrylamide.

The following are illustrative but non-limitative examples in table form of the adhesive compositions of the The procedures used in testing the control and instant adhesive compositions of Tables I, II and III were as follows. The test samples were prepared in accordance with ASTM D-906-64 (Reapproved 1970), herein incorporated by reference, and applied to the birch test panels at a glue spread rate of 40 lb./1000 sq. ft. single glue line, assembly time of 1 minute, a press temperature of 121° C, a press time of three minutes and a pressure of 150 psi.

The one-half hour boil test was carried out in accordance with ASTM D-1151-72 using a preconditioning under par. 4.1 of one day and condition 16, i.e. immersion in boiling water for one-half hour and determining the average strength after exposure in accordance with par. 5.2.1.

The 2-cycle boil test was carried out in accordance with Commercial Standard CS35-61, Hardwood Plywood, published by U.S. Dept. of Commerce, Sup. of Docs., Washington 25, D.C., which is herein incorporated by reference, par. 5.4.2 thereof.

The 48 hour soak test is carried out in accordance with the procedure of ASTM D-1151-72, condition 6, wherein the specimen is immersed in water at a temperature of 23° C for 48 hours and then subjected to the shear strength test.

The shelf or pot life end point is taken as the time at which the adhesive composition gels to the point that it will no longer flow from the container. The sample is not agitated during the total test period and the container is tightly capped so that no skin is formed.

It is to be noted that the pH of the RE resin emulsion is about 4.5 to 5.5 without the addition of the $AlCl_3$ solution thereto. When about 1.5 to 12.0 parts by weight of the $AlCl_3$ solution (containing about 0.21 gram equivalents $AlCl_3$/100 gms) is added to 100 parts by weight of the resin emulsion to thereby provide about 0.0032 to 0.025 gram equivalents $AlCl_3$/100 gms emulsion, the pH is lowered to about between 3.10 and 3.35 to 2.40. However, the pH is then raised by the addition of the basic triethanolamine in a mole ratio of $TEOA/AlCl_3$ of 0.68 to 1.67 to about 3.4 to about 3.8. The triethanolamine acts as a cross-linking inhibitor. It is postulated, although the mechanism of action is not known to applicant, that this inhibition may occur because the triethanolamine raises the pH of the adhesive composition to thus slow the catalytic action of the $AlCl_3$ but not to the lower pH value of 4.5 for the resin emulsion without the catalyst, which would apparently destroy its adhesive property. Another postulation is that triethanolamine being a chelating agent ties up the $Al+++$ and prevents the $AlCl_3$ from catalyzing the cross-linking of the resin polymer; then, curing the adhesive under pressure and elevated temperatures, the chelation is broken releasing the catalyst to initiate the cross-linking required to provide the adhesion.

The instant adhesive composition is directly applicable to semi-porous and porous substrates, such as hardwoods, softwoods, hardboard, particle board, high pressure laminates and similar materials in appropriate pressing equipment in open assembly time up to about five minutes and closed assembly time up to about twenty minutes. The adhesive is primarily applicable to hot press (pressures of about 25-200 psi) or high frequency cure although it will produce an effective Type II water resistant bond when pressed at room temperature (25° C) for about 40 minutes. The press time will vary depending on the type of press, method of cure, temperature, spread rate, assembly time and type of substrates being bonded.

What is claimed is:

1. A pre-mixed catalyzed adhesive composition comprised of (a) an aqueous cross-linkable vinyl acetate resin emulsion including polymerized vinyl acetate, in which the polymerized vinyl acetate is made from a monomer mixture of 80-97% vinyl acetate and 3-20% of a mixture of an alkyl ester of an acid selected from the class consisting of acrylic acid and methacrylic acid and an N-alkylol derivative of an amide of an alpha, beta-unsaturated carboxylic acid in an aqueous medium containing about 3-6% by weight of a hydrocolloid selected from the class consisting of polyvinyl alcohol, hydroxyethylcellulose and carboxymethylcellulose, by weight of the monomer mixture, (b) an acidic metal salt cross-linking catalyst selected from the class consisting of aluminum chloride, aluminum nitrate, chromic chloride and chromic nitrate in an amount of about 0.0032 to 0.025 gram equivalents per 100 grams of the resin emulsion, and (c) a cross-linking inhibitor selected from the class consisting of ammonia, alkyl amines and alkylol amines wherein the mole ratio of the cross-linking inhibitor to catalyst ranges from a minimum of about 0.1 to 0.2 to a maximum of about 0.7 to 1.7.

2. The adhesive composition of claim 1 in which the polymerized vinyl acetate is made from a monomer mixture of about 90-98% vinyl acetate and about 2-10% of an N-alkylol derivative of an amide of an alpha, beta-unsaturated carboxylic acid, by weight.

3. The adhesive composition of claim 1 wherein the N-alkylol derivative of an amide of an alpha, beta-unsaturated carboxylic acid is N-methylol acrylamide.

4. The adhesive composition of claim 1 wherein the mole ratio of the inhibitor to the catalyst is sufficient to at least increase the shelf life of the resin emulsion plus catalyst alone, the adhesive composition when applied to substrates providing a cured water resistant bond of at least 50 psi when subjected to a one-half hour boil test.

5. The adhesive composition of claim 1 wherein the alkyl ester of acrylic acid is ethyl acrylate and the N-alkylol derivative of an amide of an alpha, beta-unsaturated carboxylic acid is N-methylol acrylamide.

6. The adhesive composition of claim 5 wherein the catalyst is aluminum chloride in an amount of about 0.0032 to 0.025 gram equivalents of $AlCl_3$ per 100 grams of resin emulsion.

7. The adhesive composition of claim 6 wherein the cross-linking inhibitor is triethanolamine.

8. The adhesive composition of claim 7 wherein the hydrocolloid is polyvinyl alcohol.

9. A pre-mixed catalyzed adhesive composition comprised of (a) an aqueous cross-linkable vinyl acetate emulsion of a terpolymer made by polymerizing a monomer mixture of about 90-92% vinyl acetate, about 4-6% ethyl acrylate and about 2-5% N-methylol acrylamide, in an aqueous medium containing about 3-6% of polyvinyl alcohol by weight of the monomer mixture, (b) an acidic catalyst of about 0.0032 to 0.025 gram equivalents of aluminum chloride per 100 grams of the resin emulsion and (c) a cross-linking inhibitor of triethanolamine, in a mole ratio of about 0.1-0.2 to about 0.7 to 1.7 of triethanolamine to aluminum chloride.

10. A structure comprising two substrates bonded together by the adhesive composition of claim 1 in a cured condition.

11. A structure comprising two substrates bonded together by the adhesive composition of claim 2 in a cured condition.

12. A structure comprising two substrates bonded together by the adhesive composition of claim 4 in a cured condition.

13. A structure comprising two substrates bonded together by the adhesive composition of claim 5 in a cured condition.

14. A structure comprising two substrates bonded together by the adhesive composition of claim 6 in a cured condition.

15. A structure comprising two substrates bonded together by the adhesive composition of claim 7 in a cured condition.

16. A structure comprising two substrates bonded together by the adhesive composition of claim 9 in a cured condition.

17. The adhesive composition of claim 1 wherein the N-alkylol derivative of an amide of an alpha, beta-unsaturated carboxylic acid is N-methylol acrylamide.

18. The adhesive composition of claim 1 wherein the catalyst is aluminum chloride and the inhibitor is triethanolamine.

19. The adhesive composition of claim 1 wherein the hydrocolloid is polyvinyl alcohol.

* * * * *

UNITED STATES PATENT OFFICE
CERTIFICATE OF CORRECTION

Patent No. 4,085,074  Dated April 18, 1978

Inventor(s) Ming Cho Woo

It is certified that error appears in the above-identified patent and that said Letters Patent are hereby corrected as shown below:

Col. 1, line 25, change "ot" to ---to---.

Table III at vertical column 16 and horizontal col. "48 hr. Soak, psi - % W.F." eliminate "0" and substitute ---20---.

Signed and Sealed this

Nineteenth Day of September 1978

[SEAL]

Attest:

RUTH C. MASON
Attesting Officer

DONALD W. BANNER
Commissioner of Patents and Trademarks